United States Patent
Johansson et al.

(10) Patent No.: US 9,730,090 B2
(45) Date of Patent: Aug. 8, 2017

(54) RADIO LINK FAILURE REPORT EXTENSIONS IN MOBILE COMMUNICATION NETWORKS

(71) Applicant: MEDIATEK, INC., Hsin-Chu (TW)

(72) Inventors: Per Johan Mikael Johansson, Kungsangen (SE); Shiang-Jiun Lin, Hsinchu (TW); Yih-Shen Chen, Hsinchu (TW); William Plumb, Charlestown, MA (US)

(73) Assignee: MEDIATEK, INC., Hsin-Chu (TW)

( * ) Notice: Subject to any disclaimer, the term of this patent is extended or adjusted under 35 U.S.C. 154(b) by 567 days.

(21) Appl. No.: 14/078,789

(22) Filed: Nov. 13, 2013

(65) Prior Publication Data

US 2014/0133465 A1    May 15, 2014

Related U.S. Application Data

(60) Provisional application No. 61/726,847, filed on Nov. 15, 2012.

(51) Int. Cl.
*H04W 24/04* (2009.01)
*H04W 76/02* (2009.01)
(Continued)

(52) U.S. Cl.
CPC ......... *H04W 24/04* (2013.01); *H04W 76/027* (2013.01); *H04W 24/10* (2013.01); *H04W 36/0083* (2013.01)

(58) Field of Classification Search
CPC .............. H04W 24/10; H04W 76/027–76/028
See application file for complete search history.

(56) References Cited

U.S. PATENT DOCUMENTS

2011/0170418 A1    7/2011    Såfors et al. ................ 370/241
2011/0250880 A1    10/2011    Olsson ........................ 455/423
(Continued)

FOREIGN PATENT DOCUMENTS

| EP | 2398280 A1 | 2/2009 |
| WO | WO2012071704 A | 11/2010 |
| WO | WO2014023817 A * | 2/2014 ............ H04W 24/10 |

OTHER PUBLICATIONS

International Search Report and Written Opinion of International Search Authority for PCT/CN2013/087122 dated Feb. 20, 2014 (10 pages).

(Continued)

*Primary Examiner* — Marcus R Smith
(74) *Attorney, Agent, or Firm* — Imperium Patent Works; Zheng Jin (57) ABSTRACT

A method of reporting UE measurement state information in RLF report is provided. A UE performs radio measurements of a serving cell and neighbor cells in a mobile communication network. The UE evaluates a measurement reporting criteria and attempts to access the network to deliver a measurement report if the criteria is met. The UE then detects a radio link failure or a handover failure event and reconnects to the network by performing RRC reestablishment or RRC establishment. Finally, the UE transmits a failure event report to the network. The failure event report comprises UE measurement state information corresponds to the failure event. The UE measurement state information helps the network to determine whether to apply corrective actions to mitigate the failure.

22 Claims, 5 Drawing Sheets

(51) Int. Cl.
*H04W 24/10* (2009.01)
*H04W 36/00* (2009.01)

(56) References Cited

U.S. PATENT DOCUMENTS

| | | | |
|---|---|---|---|
| 2012/0069732 A1 | 3/2012 | Xu et al. ........................ | 370/221 |
| 2013/0189973 A1* | 7/2013 | Chang ................. | H04W 76/046 |
| | | | 455/423 |
| 2013/0250857 A1 | 9/2013 | Lu ................................ | 370/328 |
| 2014/0317456 A1* | 10/2014 | Kim ...................... | H04W 24/10 |
| | | | 714/48 |
| 2014/0335855 A1* | 11/2014 | Lee ...................... | H04W 24/10 |
| | | | 455/426.1 |
| 2015/0189598 A1* | 7/2015 | Zhang .................. | H04W 24/10 |
| | | | 370/311 |
| 2015/0208264 A1* | 7/2015 | Koskinen .......... | H04W 52/0212 |
| | | | 455/67.11 |

OTHER PUBLICATIONS

EPO, Search Report for the EP patent application 13854571.0 dated Oct. 16, 2015 (9 pages).

3GPP TSG-RAN WG5 Meeting #55 R5-121843, Huawei, Addition of New TC 8.6.4.3: Radio Link Failure Logging/Reporting at RRC Connection Establishment and Reestablishment, Prague, Czech Republic dated May 21-25, 2012 (12 pages).

3GPP TSG-RAN WG3 #75 R3-120097, Fujitsu, Radio Link failure Due to Handover Preparation Failure, Dresden, Germany dated Feb. 6-10, 2012 (6 pages).

3GPP TS 37.320 V11.1.0 (Sep. 2012), 3rd Generation Partnership Project; Technical Specification Group Radio Access Network; Universal Terrestrial Radio Access (UTRA) and Evolved Universal Terrestrial Radio Access (E-UTRA); Radio Measurement Collection for Minimization of Drive tests (MDT); Overall Description; Stage 2 (Release 11).

* cited by examiner

RADIO LINK FAILURE REPORT EXTENSIONS IN MOBILE COMMUNICATION NETWORKS

CROSS REFERENCE TO RELATED APPLICATIONS

This application claims priority under 35 U.S.C. §119 from U.S. Provisional Application No. 61/726,847, entitled "Radio Link Failure Report Extensions," filed on Nov. 15, 2012, the subject matter of which is incorporated herein by reference.

TECHNICAL FIELD

The disclosed embodiments relate generally to failure event reporting, and, more particularly, to radio link failure report extensions in mobile communication network.

BACKGROUND

In 3GPP Long-Term Evolution (LTE) networks, an evolved universal terrestrial radio access network (E-UTRAN) includes a plurality of base stations, e.g., evolved Node-Bs (eNBs) communicating with a plurality of mobile stations referred as user equipments (UEs). Radio link monitoring (RLM) is a mechanism for a UE to monitor the quality of a downlink (DL) for determining if the radio link is good enough to continue transmission. In addition to RLM, it has been proposed that a UE shall consider radio link failure (RLF) to be detected based on at least three problems. First, physical layer problems based on N310/N311/T310 mechanism (DL radio link failure). Second, random access problems indicated from MAC layer (UL radio link failure). Third, problems indicated from RLC layer that the maximum number of retransmission has been reached (UL radio link failure).

A connection failure typically indicates a too late handover, a too early handover, or handover to a wrong cell. In a too late HO problem, a connection failure occurs in the source cell before the handover was initiated or during a handover. The UE attempts to re-establish the radio link connection in the target cell (if handover was initiated) or in a cell that is not the source cell (if handover was not initiated). In a too early HO problem, a connection failure occurs shortly after a successful handover from a source cell to a target cell or during a handover. The UE attempts to re-establish the radio link connection in the source cell. In a wrong cell HO problem, a connection failure occurs shortly after a successful handover from a source cell to a target cell or during a handover. The UE attempts to re-establish the radio link connection in a cell other than the source cell and the target cell.

"RLF report" is used in LTE systems allowing UE to report information to the network about a connection failure event, radio link failure (RLF) or handover failure (HOF). The information includes available geographical location information and available mobility measurement results. The current RLF report is used to optimize handover parameters and to detect coverage problems. For example, eNodeB may utilize information contained in the RLF report to optimize UE measurement configuration and HO algorithm behavior to find acceptable or as low as possible HO problem rate, as well as to find a balanced Ping-Pong rate or HO rate.

A major complication, however, is that handover performance can be very different depending on the UE state and configuration, which may be deliberate and in turn depending on quality of service requirements of the current applications of the UE. The UE state and configuration is not reported in the current RLF report. In many cases, e.g., when the UE goes to idle because of connection failure, it is impossible by the network to correlate the RLF report with configuration information used for the UE by the network node that was serving the UE at the time of failure. In addition, UE internal state like speed state, UL SRB transmission state is not reliably known in the network. Even though a certain amount of UEs report of connection problem events to the network, it may be difficult or impossible for the network to determine if there is a problem that needs corrective action or not. This is because UEs of different state and configuration could be expected to have different performance targets and this UE state or configuration information is not always known by the network.

It is an objective of the current invention to address the shortcomings of prior art by adding sufficient UE state and configuration information to the "RLF report". It is an objective of the current invention to provide more highly reliable information than a network solution could provide. This is to enable the network to assess what should be the appropriate expected performance targets for a UE reporting on a connection failure event. The information can help the network to determine whether to apply corrective actions to mitigate this kind of failure. Possible corrective actions could involve using less DRX so UE will perform radio measurements with better accuracy, adjusting RLF reporting criteria so that measurement report is sent sooner or later, enhancing transmission for UL/DL by adjusting power control or by using inter cell interference coordination.

SUMMARY

A method of reporting UE measurement state information in RLF report is provided. A UE performs radio measurements of a serving cell and neighbor cells in a mobile communication network. The UE evaluates a measurement reporting criteria and attempts to access the network to deliver a measurement report if the criteria is met. The UE then detects a radio link failure or a handover failure event and reconnects to the network by performing RRC reestablishment or RRC establishment. Finally, the UE transmits a failure event report to the network. The failure event report comprises UE measurement state information corresponds to the failure event. The UE measurement state information helps the network to determine whether to apply corrective actions to mitigate the failure.

In a first advantageous aspect, the UE measurement state information comprises information on whether a measurement event entering condition is triggered, whether a measurement reporting criteria has been met, and/or progression information on the measurement report transmission before the failure event occurs. In a second advantageous aspect, the UE measurement state information comprises UE speed state or parameters that are impacted by the UE speed state, in particular the time-to-trigger (TTT) parameter that is adapted based on UE speed in connected mode at the time of failure. In a third advantageous aspect, the UE measurement state information comprises UE measurement performance information indicates to what extent the UE wakes up to perform measurements. The UE measurement performance is related to a UE discontinuous reception (DRX) state that is applicable when the UE detects the failure event.

Other embodiments and advantages are described in the detailed description below. This summary does not purport to define the invention. The invention is defined by the claims.

DETAILED DESCRIPTION

Reference will now be made in detail to some embodiments of the invention, examples of which are illustrated in the accompanying drawings.

Figure 1:
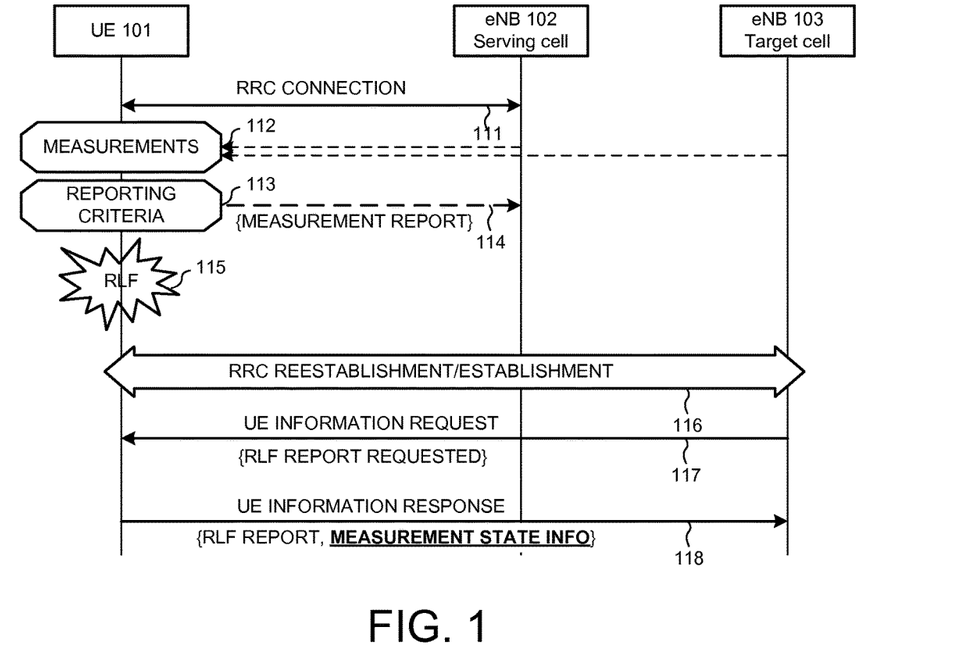
FIG. 1 illustrates a wireless communication network with UE sending RLF report including measurement state information in accordance with one novel aspect.

FIG. 1 illustrates a mobile communication network 100 with UE sending RLF report including measurement state information in accordance with one novel aspect. Mobile communication network 100 comprises a user equipment UE 101, a first base station eNB 102, and a second base station eNB 103. In step 111, UE 101 establishes a radio resource control (RRC) connection with eNB 102 in a serving cell. In step 112, UE 101 performs radio measurements on radio signals of the serving cell and other neighbor cells, e.g., a target cell by eNB 103. In step 113, UE 101 evaluates certain measurement reporting criteria. If the criteria is met, then in step 114, UE 101 generates a measurement report and attempts to deliver the measurement report to eNB 102.

Typically, upon receiving a measurement report, the network would decide to hand over the UE to a better cell, e.g., the target cell by eNB 103, and perform necessary network signaling to prepare the better cell. The network would then send a handover (HO) command to the UE. The UE would then connect to the better cell. However, in case the procedure above does not work, then the result will be Radio Link Failure (RLF) or Handover Failure (HOF) when the UE leaves the serving cell. Typical failure scenarios include the measurement report never reaches the network or the handover command never reaches the UE.

In step 115, UE 101 detects a failure event and generates an RLF report. In step 116, UE 101 attempts RRC re-establishment and/or RRC establishment to reconnect to the network. For example, UE 101 eventually establishes an RRC connection with eNB 103 in the target cell. In step 117, eNB 103 sends a UE information request to UE 101 requesting for RLF report. In step 118, UE 101 sends a UE information response back to eNB 103, which includes the RLF report.

In one novel aspect, the UE information includes the RLF report as well as UE measurement state information. The measurement state information helps the network to determine whether to apply corrective actions to mitigate the failure. Current RLF report is targeting for corrective actions including the update of HO parameters or the update of basic DL coverage parameters. Currently, there is no discrimination between UL and DL reasons for a connection failure— such discrimination would help to find out suitable corrective action that may be different from changing HO parameters. In fact, the transmission of the measurement report in the UL is likely to fail and the corrective action may be related to the UL radio resource management rather than mobility. Therefore, information on UE measurement state can help to make conclusions on whether other or additional RRM corrective actions can be used to mitigate the failure, e.g., modify UL power control, L1 transmission parameter.

Figure 2:
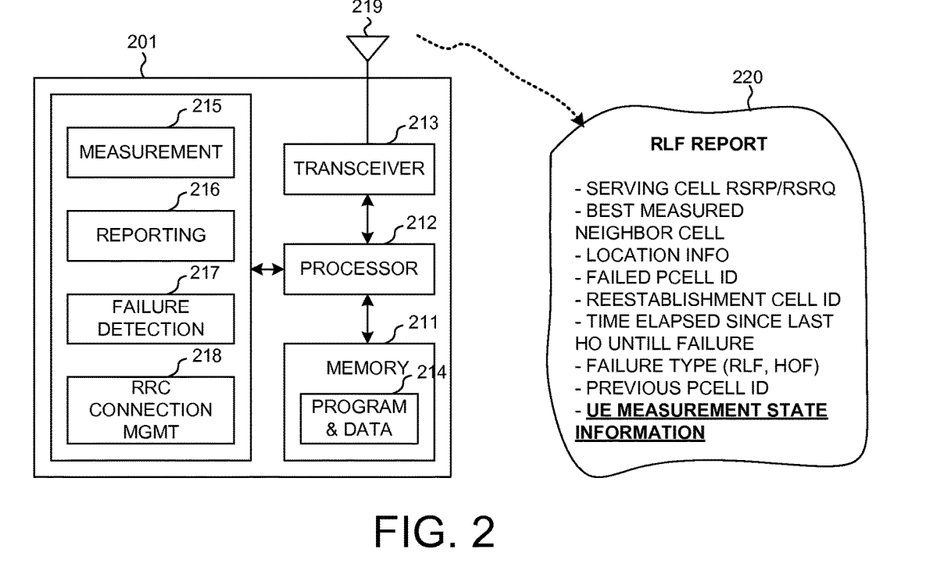
FIG. 2 is a simplified block diagram of a user equipment in accordance with one novel aspect.

FIG. 2 is a simplified block diagram of a user equipment UE 201 in accordance with one novel aspect. UE 201 comprises memory 211, a processor 212, a radio frequency (RF) transceiver 213 coupled to an antenna 219. RF transceiver 213, coupled with antenna 219, receives RF signals from antenna 219, converts them to baseband signals and sends them to processor 212. RF transceiver 213 also converts received baseband signals from processor 212, converts them to RF signals, and sends out to antenna 219. Processor 212 processes the received baseband signals and invokes different functional modules to perform features in UE 201. Memory 211 stores program instructions and data 214 to control the operations of UE 201.

UE 201 also comprise various modules including a measurement module 215 that performs radio signal measurements, a reporting module 216 that evaluates measurement reporting criteria, a failure detection module 217 that detects failure events, and an RRC connection management module 218 that performs cell (re)selection and RRC (re)establishment procedures. The different modules are function modules that can be implemented by hardware circuitry in combination of software/firmware. The function modules, when executed by the processor 212 (e.g., via executing program codes 214), allow UE 201 to perform various functions accordingly. A base station may comprise similar structure including various function modules to support related functionalities.

In LTE system, when a UE experiences RLF, it records the RLF report in VarRLF-Report, as depicted by box 220 of FIG. 2. Typically, the RLF report includes the following information: serving cell reference signal received power (RSVP)/reference signal received quality (RSRQ), best measured neighbor cell, location information, failed PCELL ID, reestablishment cell ID, time elapsed since last HO until connection failure, failure type (RLF, HOF), previous PCELL ID. When the UE connects back to the network, it indicates RLF-infoAvailable through RRC Connection Reconfiguration Complete, RRC Connection Reestablishment Complete, or RRC Connection Setup Complete. The network retrieves the RLF information through UE Information Request and UE reports the RLF information through UE Information Response.

The current RLF report is used to optimize handover parameters and to detect coverage problems. For example, the network may apply corrective actions to mitigate the failure. It is observed that typical failure scenarios include the measurement report never reaches the network or the handover command never reaches the UE. Therefore, It can be assumed that possible corrective actions could involve using less Discontinuous reception (DRX) so UE will perform radio measurements with better accuracy, adjusting RLF reporting criteria so that measurement report is sent sooner or later, enhancing transmission for UL/DL by adjusting power control or by using inter cell interference coordination, etc.

In one novel aspect, the RLF report also includes UE measurement state information to help the network to determine whether, what, and how to apply corrective actions to mitigate the failure. In a first advantageous aspect, the UE measurement state information comprises information on whether a measurement event entering condition is triggered, whether a measurement reporting criteria has been met, and/or progression information on the measurement report transmission before the failure event occurs. In a second advantageous aspect, the UE measurement state information comprises UE speed state or parameters that are impacted by the UE speed state, in particular the time-to-trigger (TTT) parameter that is adapted based on UE speed in connected mode at the time of the failure. In a third advantageous aspect, the UE measurement state information comprises UE measurement performance information indicates to what extent the UE wakes up to perform measurements. The UE measurement performance is related to a UE discontinuous reception (DRX) state that is applicable when the UE detects the failure event. Detailed embodiment of the UE measurement state information is now illustrated below with accompanying drawings.

Figure 3:
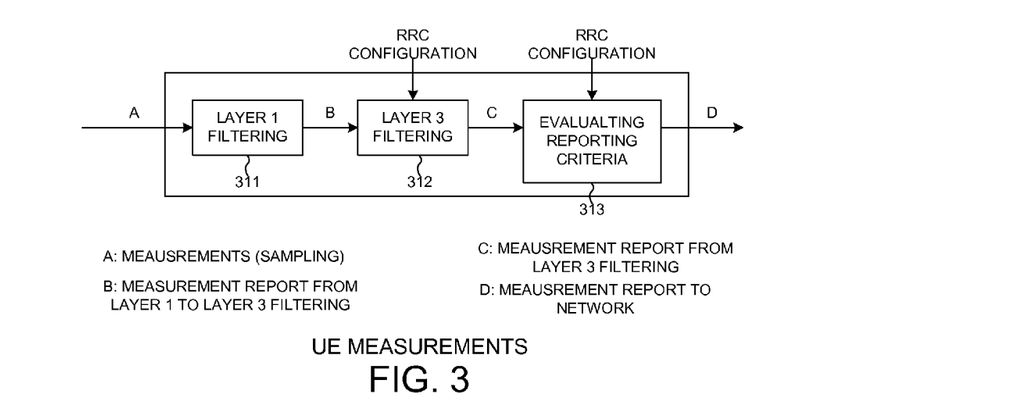
FIG. 3 illustrates a detailed procedure of UE performing measurements, determining measurement report and evaluating reporting criteria.

FIG. 3 illustrates a detailed procedure of a UE performing measurements, determining measurement report and evaluating reporting criteria. As illustrated in FIG. 3, in LTE systems, the entire measurements and measurement reporting procedure involves many steps. At point A, the UE receives radio signals and performs measurements by taking samples internal to the physical layer. In step 311, the UE performs Layer-1 filtering of the inputs measured at point A. How the measurements are actually executed in the physical layer (inputs A and Layer-1 filtering) is UE implementation dependent. At point B, measurements from Layer-1 are reported to Layer-3. In step 312, the UE performs Layer-3 filtering on the measurements provided at point B. The behavior of the Layer-3 filters are standardized and the configuration of the Layer-3 filters is provided by RRC signaling. At point C, a measurement after processing Layer-3 filter is reported. The reporting rate is identical to the reporting rate at point B. For example, the reporting period at point C equals to one measurement period at point B. This measurement is used as input for one or more evaluation of reporting criteria. In step 313, the UE evaluates the one or more reporting criteria and determines whether actual measurement reporting is necessary at point D. The evaluation can be based on more than one flow of measurements at reference point C, e.g., to compare between different measurements. The UE evaluates the reporting criteria at least every time a new measurement result is reported at point C. The reporting criteria are standardized and the configuration is provided by RRC signaling. Finally, at point D, measurement report information (a measurement result message) is sent to the network on the radio interface.

Figure 4:
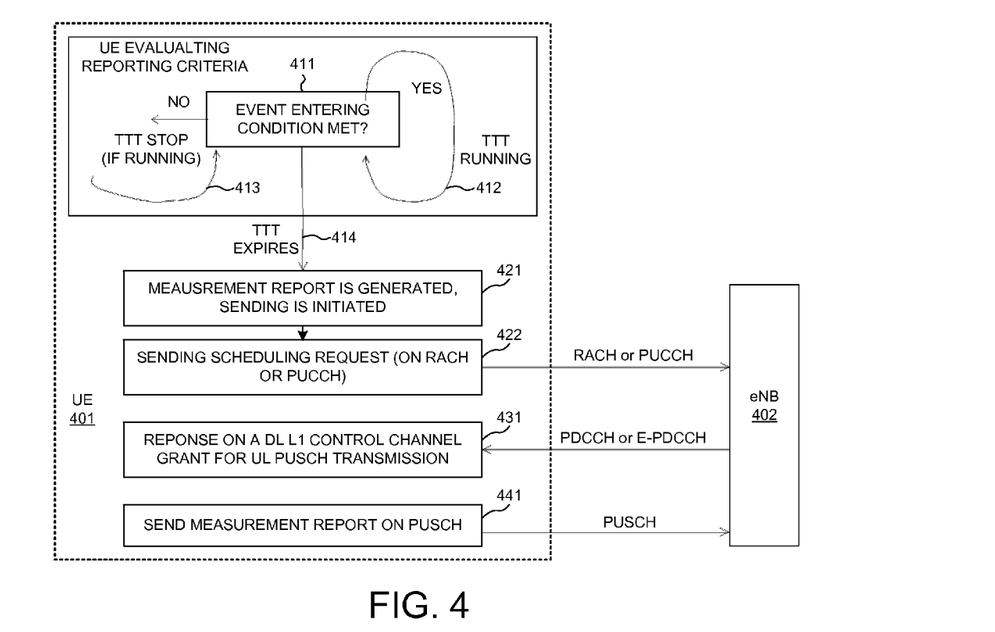
FIG. 4 illustrates a detailed procedure of UE evaluating reporting criteria and sending measurement report to the network.

FIG. 4 illustrates a detailed procedure of a UE 401 evaluating reporting criteria and sending measurement report to the network (eNB 402). In step 411, UE 401 first evaluates a mobility measurement event entering condition has been met for triggering a measurement report, but has not yet triggered the sending of the measurement report. The following events can be configured in the UE for the various event entering conditions: event A1—serving cell becomes better than a threshold; event A2—serving cell becomes worse than a threshold; event A3—neighbor cell becomes offset better than serving PCELL; event A4—neighbor cell becomes better than a threshold; event A5—serving PCELL becomes worse than a first threshold while neighbor cell becomes better than a second threshold; event A6—neighbor cell becomes offset better than serving SCELL; event B1—inter RAT neighbor cell becomes better than a threshold; and event B2—PCELL becomes worse than a first threshold and inter RAT neighbor cell becomes better than a second threshold.

If the event entering condition is met, i.e., the answer to step 411 is yes, then UE 401 starts a timer-to-trigger (TTT) timer in step 412. On the other hand, if the answer to step 411 is no, then UE 401 stops the TTT timer (if running), and continues to evaluate the mobility measurement event entering condition. Upon the expiring of the TTT timer, in step 414, the measurement report is then triggered. In step 421, UE 401 generates a measurement report and initiates the sending of the measurement report. In step 422, UE 401 sends a scheduling request to eNB 402 on a random access channel (RACH) or on a physical uplink control channel (PUCCH). In step 421, UE 401 receives a response on a physical downlink control channel (PDCCH) or an enhanced PDCCH (e-PDCCH). The PDCCH or e-PDCCH contains a grant for uplink transmission on a physical uplink shared channel (PUSCH). In step 441, UE 401 sends the measurement report to eNB 402 on the PUSCH.

In a first advantageous aspect, based on the detailed measurements and reporting procedure illustrated above, it is proposed that the UE measurement state information includes a list of the following information. First, the measurement state information includes whether any mobility measurement event entering condition has been met. The benefit of such added information is to understand the effect of the used TTT, as one corrective action could involve making TTT shorter or longer adapted based on UE speed.

Second, the UE measurement state information includes whether the sending of a measurement report has been triggered but it has not been successfully sent when a failure event occurred. This knowledge would make it possible to separate problems related to triggering of measurement reports and problems related to sending of measurement reports, for which the corresponding corrective actions may be completely different. If measurement report has not yet been triggered when the failure occurred, but there seems to exist suitable handover candidate cells, then the main option is to change the measurement configuration to trigger measurement report earlier for those suitable HO candidate cells. If measurement report had been triggered but not successfully sent when the failure occurred, then it could be possible to change L1 or RRM configurations to increase the likelihood of successful measurement report transmission.

Third, the detail information on the progression of the measurement report transmission may be included in the UE measurement state information. The detailed progression information may include at least one of whether a scheduling request on RACH is sent, whether a scheduling request on PUCCH is sent, and whether the measurement report on PUSCH is sent. The benefit of such added information on uplink problems for measurement report transmission helps the network to get a deeper understanding on which uplink physical channel is not working and could be subject to corrective action. If in most cases, measurement report had been triggered and PUCCH has been used for repeated scheduling requests when failure occurs, then a possible corrective action could be to change PUCCH settings.

Fourth, the measurement report or the mobility measurement event can be identified by a measurement ID. The main benefit of this is the compactness (small volume of reported information). This information, however, requires knowledge of the UE measurement configuration in order to know how to interpret. Because many radio access networks consistently use measurement IDs the same way, using this information could be a practical way. An alternative way of identifying a measurement report is to identify by event ID, e.g., A3, A2, B1 etc. Such simplified identification would not reveal the full measurement configuration for the triggered measurement report, but would give a very good clue on what kind of action would have been taken if the measurement report has been received. This information is also very compact in terms of radio signaling.

Based on the UE measurements and reporting procedure illustrated in FIGS. 3 and 4, it is also observed that various events, thresholds, and hysteresis values and TTT timer are configured to control the evaluation of measurement reporting criteria. If a failure occurs, one possible corrective action is to change parameters that affect the UE evaluation of reporting criteria to make measurement report be triggered sooner or later. However, in order to do so, the network must know which parameters were used at the time of the failure.

Figure 5:
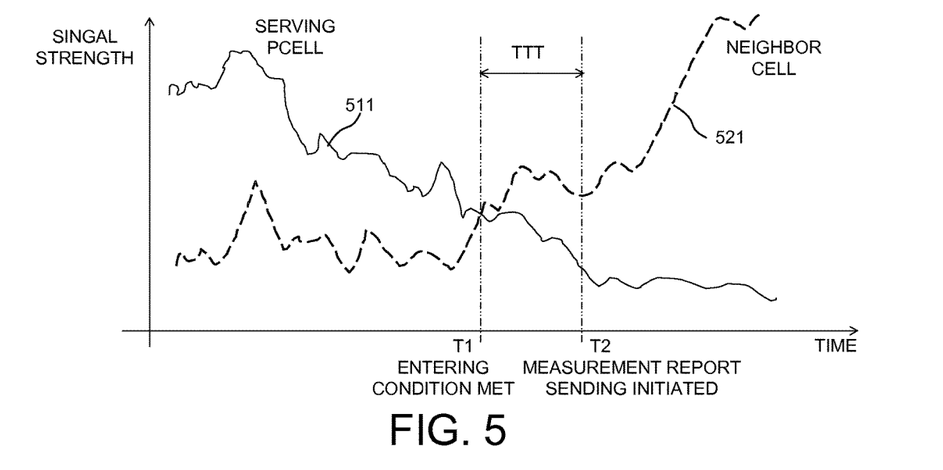
FIG. 5 illustrates a time to trigger (TTT) measurement parameter adapted by UE.

FIG. 5 illustrates a time to trigger (TTT) measurement parameter adapted by a UE using an example of event A3. Event A3 occurs when the radio signal strength of a neighbor cell becomes offset better than a serving PCELL. In the example of FIG. 5, line 511 indicates the signal strength of the serving PCELL, while line 521 indicates the signal strength of the neighbor cell. At time T1, the signal strength of the neighbor cell becomes better than the serving PCELL, which satisfies an event entering condition for triggering a measurement report. The UE thus starts a TTT timer at time T1. At time T2, the TTT timer expires, which triggers the sending of the measurement report. While the value of TTT is configured by the network, a UE can autonomously modify/scale such parameter depending on its speed, affecting mobility performance. The network does not always know what parameter value the UE uses, and thus it is difficult to interpret failure reports to determine corrective actions. For example, in order to do a corrective action relating to a scaled parameter, shall the network modify the base parameter, or shall the network modify the speed-scaling configuration? Such question cannot be answered unless the network knows the detail state of the UE.

In a second advantageous aspect, the UE measurement state information comprises UE speed state or parameters that are impacted by the UE speed state, in particular the time-to-trigger (TTT) parameter that is adapted and scaled based on UE speed in connected mode. This proposal is general and the speed scaling by the UE can be done differently, e.g., based on GPS speed, or L1 Doppler measurements. The speed-scaled parameters are mainly used to filter and control the triggering of measurement report. Thus, if at the time of failure, measurement evaluation in the UE has not yet determined that there are neighbor cells that are good enough to start considering to trigger a measurement report, then the speed-scaled parameters (TTT) would not affect the failure. As a result, changing it would not be a suitable corrective action and reporting it would consume radio transmission resources unnecessarily. Therefore, it is proposed that the speed scaling information and in particular TTT parameter is only included when the parameter is being used for at least one cell at the time of failure. In particular for TTT, when measurement event entering condition has met for at least one cell but corresponding measurement report has not been triggered or successfully sent yet.

Figure 6:
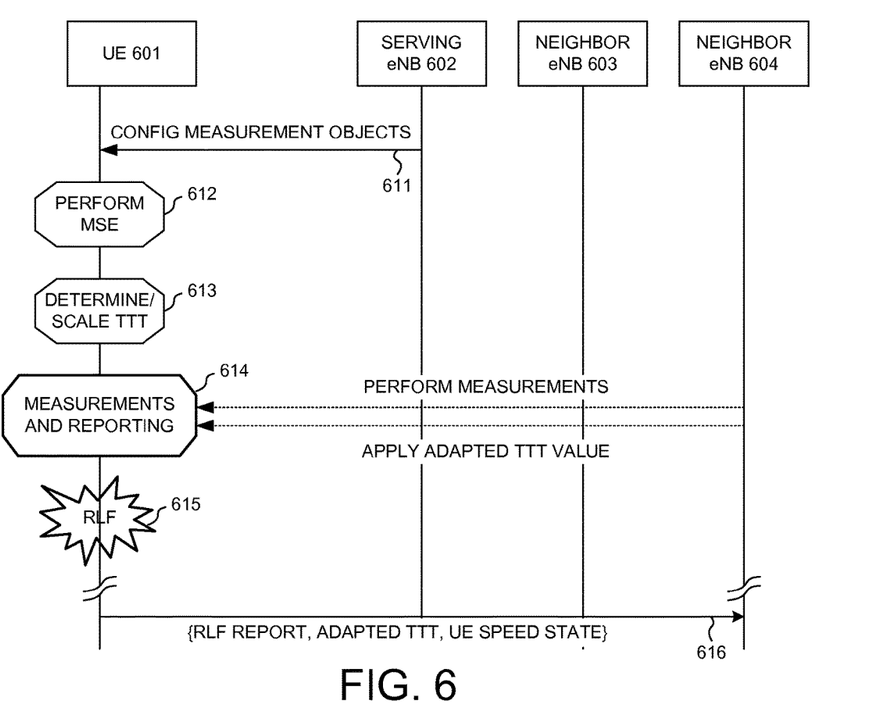
FIG. 6 illustrates one embodiment of applying adapted TTT based on UE speed state before RLF.

FIG. 6 illustrates one embodiment of applying adapted TTT based on UE speed state before RLF. In step 611, a serving eNB 602 configures measurement objects for UE 601. The measurement configuration includes a configured TTT value for UE 601. In step 612, UE 601 performs mobility state estimation (MSE) and calculates UE speed state. For example, three speed states (High, Medium, and Low) are defined. Based on network condition, UE 601 autonomously deduce its speed state of High, Medium, or Low, based on cell change count, excluding Ping-Pong cell changes. In step 613, UE 601 determines a speed-scaled TTT parameter based on the configured TTT value. For example, a faster moving UE with "High" speed state may apply a smaller TTT value; while a slower moving UE with "Low" speed state may apply a larger TTT value. This way, the TTT mechanism can be better adapted to UEs with different speed state.

In step 614, UE 601 performs measurements and evaluates measurement-reporting criteria. For example, UE 601 measures radio signal strength of its serving cell and neighbor cells from eNB 603 and eNB 604. While evaluating measurement-reporting criteria, UE 601 applies speed-scaled TTT parameter determined in step 613. In one particular example, the radio signal strength of neighbor cell from eNB 604 becomes better than the serving cell, and UE 601 starts its TTT timer with an adapted TTT value. In step 615, UE 601 detects an RLF event. After reconnecting to the network, in step 616, UE 601 reports RLF to its new serving eNB 604. The RLF report includes the adapted TTT value as well as the UE speed state at the time of the failure. Based on the adapted TTT value and the UE speed state, the network is able to do a corrective action relating to the TTT parameter.

In a third advantageous aspect, the UE measurement state information comprises UE measurement performance information indicates to what extent the UE wakes up to perform measurements. It is assumed that UE does not make measurements continuously. First, the UE normally does not have sufficient radio reception capabilities to receive and measure on all frequencies and RAT at the same time. Second, the UE is expected to turn its receiver off for battery saving when it is not required to receive from the network, e.g., during DRX sleep. The UE thus only measures detected cells on a certain frequency with some regularity. How often the UE makes measurements affects the mobility performance. As an extreme example, the UE may DRX for two seconds and then when the UE wakes up, the UE may already have lost possibility to communicate with the old serving cell. Therefore, to what extent the UE wakes up to perform measurements is important information for the network to know in order to apply corrective actions that may involve using less DRX so that UE will perform radio measurements with better accuracy.

Figure 7:
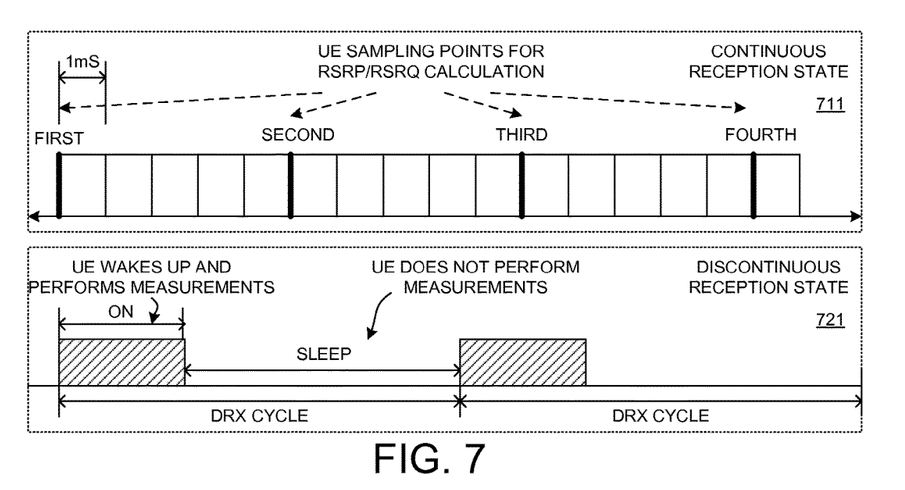
FIG. 7 illustrates different UE operation states and corresponding measurement performance.

FIG. 7 illustrates different UE operation states and corresponding measurement performance. The top half of FIG. 7 illustrates UE measurements under continuous reception state. As depicted by box 711, a UE performs measurements by taking consecutive L1 sampling points for RSRP/RSRQ calculation during an L1 measurement interval. If the UE never switches off the receiver, then the UE can produce L1 measurement samples often and thereby having a reasonably accurate representation of the average signal strength or quality during an L1 measurement interval. The bottom half of FIG. 7 illustrates UE measurements under discontinuous reception state. As depicted by box 721, within each DRX cycle, a UE wakes up and performs measurements during DRX ON, and does not perform measurements during DRX sleep. When the UE switches off the receiver from time to time, the UE cannot produce L1 measurement samples as often. The longer the DRX sleep, the longer is the reaction time for the UE to detect significant changes in radio conditions. The less the awake time the UE has to make measurements, the less accurate the L1 measurement samples will be representing the average signal strength or quality during an L1 measurement interval.

Therefore, UE measurement performance is expected to depend heavily on DRX state. How well the UE measurements reflects the real radio condition at any point in time is called UE measurement performance. UE measurements give statistically worse reflection of the real radio condition at any point in time the longer the DRX. That is, the UE measurement performance is worse the longer the DRX. In one example, the UE implements three different levels of measurement performance. Level 1 corresponds to the same measurement performance as continuous reception. Level 2 corresponds to measurement performance as if the UE had a DRX awake/sleep cycle according to configured short DRX cycle. Level 3 corresponds to measurement performance as if the UE had a DRX awake/sleep cycle according to configured long DRX cycle. When a failure event occurs, the UE determines which measurement performance level is most applicable right before (e.g., a few seconds before) the failure event.

The network needs to know exactly when the UE is awake to receive data because the network and the UE need to be well synchronized regarding DRX sleep. However, the DRX states may be short-lived and UE may transit often between short DRX and continuous transmission. Thus, the network does not always know what DRX state is applicable for the UE measurements in the brief time preceding the failure. Furthermore, there are reasons to introduce changes to allow UE measurement performance to be dependent on aspects other than DRX, e.g., that UE in some situations need to follow stricter measurement requirements than set by DRX state. For example, UE may need to support better mobility performance in a HetNet environment. In such situations, it may not be possible at all for the network to figure out what would be the expected mobility or connection performance of the UE. Therefore, it is beneficial for the UE to determine which performance level is most applicable for the few seconds before the failure and provide such information to the network.

Figure 8:
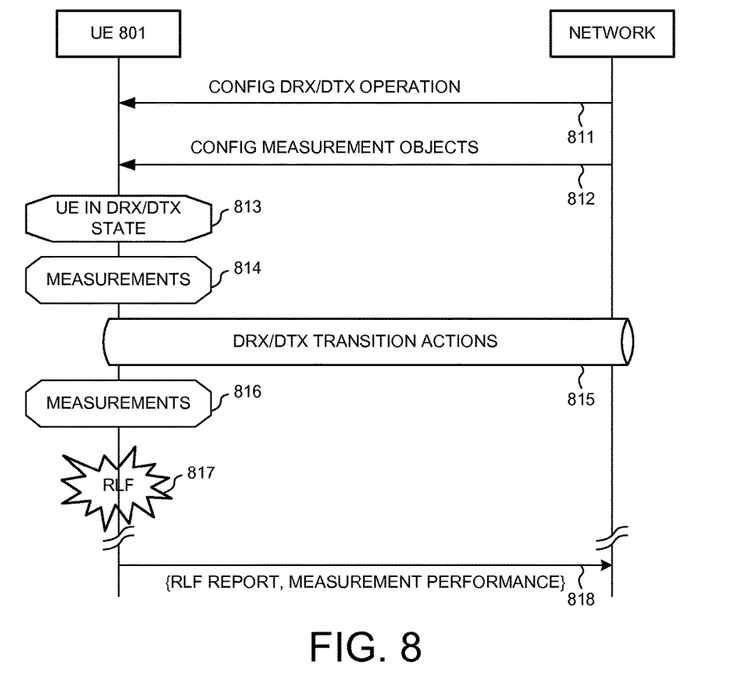
FIG. 8 illustrates one embodiment of performing measurements under different DRX states before RLF.

FIG. 8 illustrates one embodiment of performing measurements under different DRX states before RLF. In step 811, UE 801 receives configuration parameters for DRX operation. In step 812, UE 801 receives configuration parameters for measurement objects. In step 813, UE 801 enters certain DRX state. In step 814, UE 801 performs measurements. In step 815, UE 801 makes certain DRX state transition. In step 816, UE 801 performs measurements again. In step 817, UE 801 detects RLF. It is up to the UE to determine which measurement performance level is most applicable to the RLF. After UE 801 reconnects to the network, in step 818, UE 801 sends RLF report to the network, which includes UE measurement performance information most applicable at the time of (e.g., X seconds before) the RLF failure event.

Figure 9:
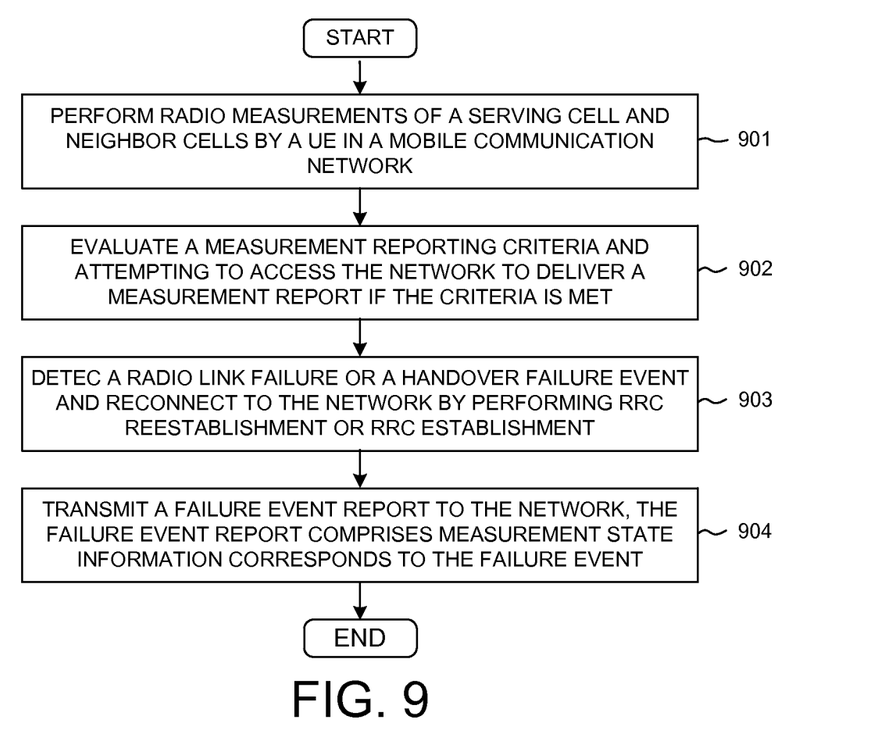
FIG. 9 is a flow chart of a method of reporting RLF with UE measurement state information in accordance with one novel aspect.

FIG. 9 is a flow chart of a method of reporting RLF with UE measurement state information in accordance with one novel aspect. In step 901, a UE performs radio measurements of a serving cell and neighbor cells in a mobile communication network. In step 902, the UE evaluates a measurement reporting criteria and attempts to access the network to deliver a measurement report if the criteria is met. In step 903, the UE detects a radio link failure or a handover failure event and reconnects to the network by performing RRC reestablishment or RRC establishment. In step 904, the UE transmits a failure event report to the network. The failure event report comprises measurement state information corresponds to the failure event.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method, comprising:
   performing radio measurements of a serving cell and neighbor cells by a user equipment (UE) in a mobile communication network;
   evaluating a measurement reporting criteria and attempting to access the network to deliver a measurement report if the criteria is met;
   detecting a radio link failure or a hand-over failure event and re-connecting to the network by performing RRC reestablishment or RRC establishment with the network; and
   transmitting a failure event report to the network, wherein the failure event report includes measurement state information that corresponds to the failure event, wherein the measurement state information comprises measurement and reporting parameters at the time of the failure event, and wherein the measurement state information further indicates the failure event is associated with which uplink channel including a random access channel (RACH), a physical uplink control channel (PUCCH), and a physical uplink shared channel (PUSCH).

2. The method of claim 1, wherein the measurement state information comprises information on whether the measurement reporting criteria has been met.

3. The method of claim 2, wherein the measurement state information comprises information on whether a measurement event entering condition is triggered.

4. The method of claim 1, wherein the measurement state information comprises progression information on measurement report transmission, the progression information comprises at least one of whether a scheduling request on RACH is sent, whether a scheduling request on PUCCH is sent, and whether the measurement report on PUSCH is sent.

5. The method of claim 1, wherein the measurement reporting criteria is identified by a measurement ID.

6. The method of claim 1, further comprising:
   adapting measurement parameters based on a UE speed state, wherein the measurement state information further comprises information on UE adaptation of the measurement parameters.

7. The method of claim 6, wherein the measurement state information includes a time to trigger (TTT) adapted based on the UE speed state, wherein the TTT is a measurement parameter indicates a time interval from triggering to sending the measurement report.

8. The method of claim 6, wherein the measurement state information includes the UE speed state.

9. The method of claim 1, wherein the measurement state information further comprises measurement performance information.

10. The method of claim 9, wherein the measurement performance information indicates to what extent the UE wakes up to perform measurements.

11. The method of claim 9, wherein the measurement performance information comprises a UE discontinuous reception (DRX) state that is applicable when the UE detects the failure event.

12. A user equipment (UE), comprising:
a measurement module that performs radio measurements of a serving cell and neighbor cells in a mobile communication network;
a reporting module that evaluates a measurement reporting criteria and attempts to access the network and deliver a measurement report if the criteria is met;
a failure detector that detects a radio link failure or a hand-over failure event;
a radio resource control (RRC) management module that performs RRC reestablishment or RRC establishment for the UE to re-connect to the network upon detecting the failure event; and
a transmitter that transmits a failure event report to the network, wherein the failure event report includes measurement state information that corresponds to the failure event, wherein the measurement state information comprises measurement and reporting parameters at the time of the failure event, and wherein the measurement state information further indicates the failure event is associated with which uplink channel including a random access channel (RACH), a physical uplink control channel (PUCCH), and a physical uplink shared channel (PUSCH).

13. The UE of claim 12, wherein the measurement state information comprises information on whether the measurement reporting criteria has been met.

14. The UE of claim 13, wherein the measurement state information comprises information on whether a measurement event entering condition is triggered.

15. The UE of claim 12, wherein the measurement state information comprises progression information on measurement report transmission, the progression information comprises at least one of whether a scheduling request on RACH is sent, whether a scheduling request on PUCCH is sent, and whether the measurement report on PUSCH is sent.

16. The UE of claim 12, wherein the measurement reporting criteria is identified by a measurement ID.

17. The UE of claim 12, wherein the UE adapts measurement parameters based on a UE speed state, and wherein the measurement state information further comprises information on UE adaptation of measurement parameters.

18. The UE of claim 17, wherein the measurement state information includes a time to trigger (TTT) adapted based on the UE speed state, wherein the TTT is a measurement parameter indicates a time interval from triggering to sending the measurement report.

19. The UE of claim 17, wherein the measurement state information includes the UE speed state.

20. The UE of claim 12, wherein the measurement state information further comprises measurement performance information.

21. The UE of claim 20, wherein the measurement performance information indicates to what extent the UE wakes up to perform measurements.

22. The UE of claim 20, wherein the measurement performance information comprises a UE discontinuous reception (DRX) state that is applicable when the UE detects the failure event.

* * * * *